(12) United States Patent
Hamer et al.

(10) Patent No.: US 8,220,478 B2
(45) Date of Patent: Jul. 17, 2012

(54) FLUID FLOW CONTROL APPARATUS

(75) Inventors: Peter James Hamer, Cheshire (GB); James Fishwick, Wigan (GB)

(73) Assignee: Bifold Fluidpower Limited, Manchester (GB)

( * ) Notice: Subject to any disclaimer, the term of this patent is extended or adjusted under 35 U.S.C. 154(b) by 563 days.

(21) Appl. No.: 12/515,243

(22) PCT Filed: Nov. 28, 2007

(86) PCT No.: PCT/GB2007/004555
§ 371 (c)(1),
(2), (4) Date: May 15, 2009

(87) PCT Pub. No.: WO2008/065392
PCT Pub. Date: Jun. 5, 2008

(65) Prior Publication Data
US 2010/0059129 A1 Mar. 11, 2010

(30) Foreign Application Priority Data
Nov. 28, 2006 (GB) .................................. 0623741.6

(51) Int. Cl.
*G05D 16/06* (2006.01)
*F16K 31/12* (2006.01)
(52) U.S. Cl. .... 137/1; 137/613; 137/625.64; 137/625.6; 137/596.14
(58) Field of Classification Search ............ 137/613, 137/884, 625.64, 625.6, 596.14, 596.16, 137/1
See application file for complete search history.

(56) References Cited

U.S. PATENT DOCUMENTS

| 3,766,943 | A | 10/1973 | Murata |
| 5,666,994 | A | 9/1997 | Stoll et al. |
| 6,314,997 | B1 * | 11/2001 | Yamashita ............... 137/596.13 |
| 6,871,576 | B2 | 3/2005 | Vari |

FOREIGN PATENT DOCUMENTS

| GB | 838387 | 6/1960 |
| GB | 876990 | 9/1961 |
| JP | 10184966 | 7/1998 |

OTHER PUBLICATIONS

PCT/GB2007/004555 International Search Report.
GB0623741.6 Search Report.

* cited by examiner

*Primary Examiner* — Kevin Lee
(74) *Attorney, Agent, or Firm* — Michael Best & Friedrich LLP

(57) ABSTRACT

A main control valve is actuated by a pilot fluid control signal between open and closed positions to supply fluid to an actuator such as a valve actuator. A stack of logic control valves is supported on the main valve- and controls the flow of the pilot signal. Each of the logic control valves has a housing of common design. Intermediate flow-directing plates of different designs provide fluid communication between adjacent housings. The stack has a common pilot feed passage and a common exhaust passage that are each defined by an annular clearance around supporting tie bars that pass through bores in the stack. Each plate has apertures that form part of the exhaust and pilot feed passages and an aperture that interconnects the returning pilot signal with the pilot inlet of the next valve in the stack. The arrangement allows for simplification of the design of the apparatus with a single housing design and multiple plate designs.

40 Claims, 15 Drawing Sheets

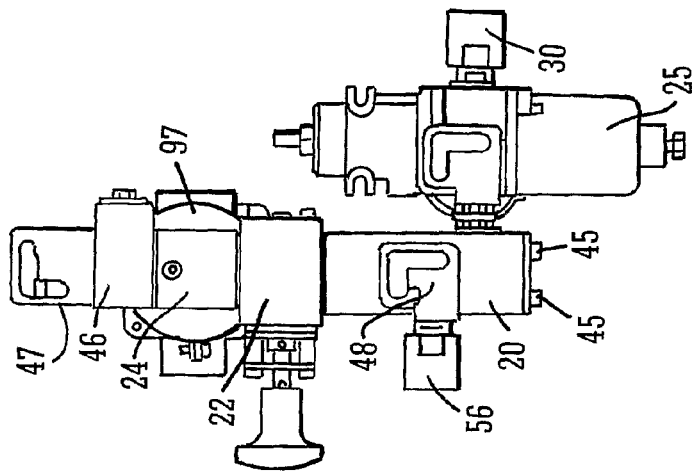
FIG. 4
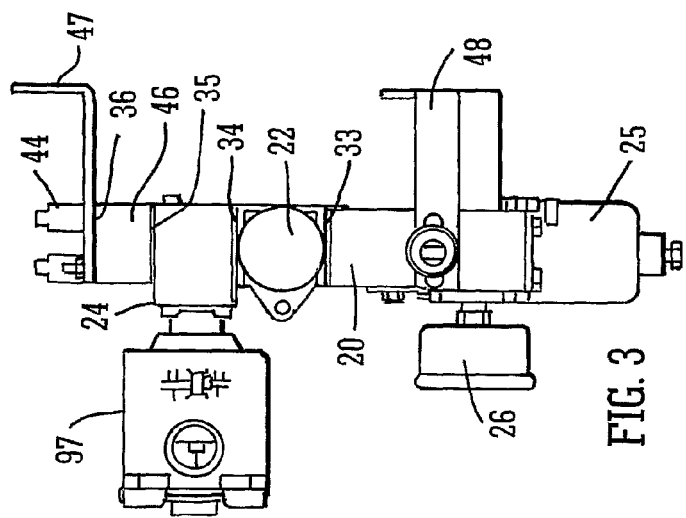
FIG. 3
FIG. 5
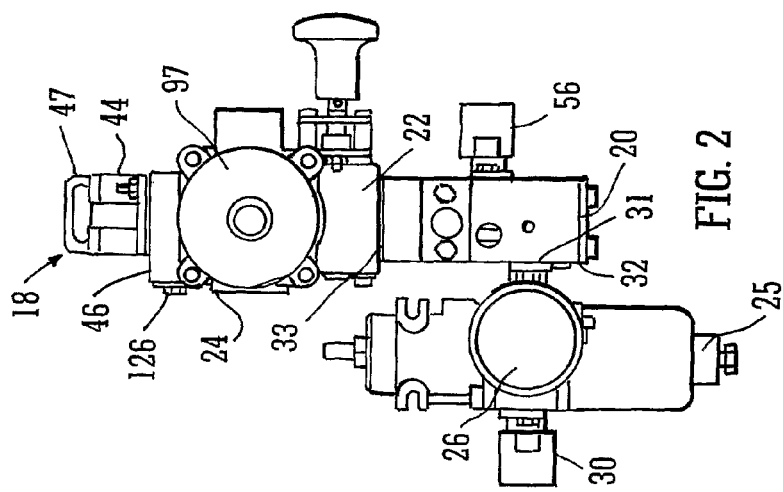
FIG. 2

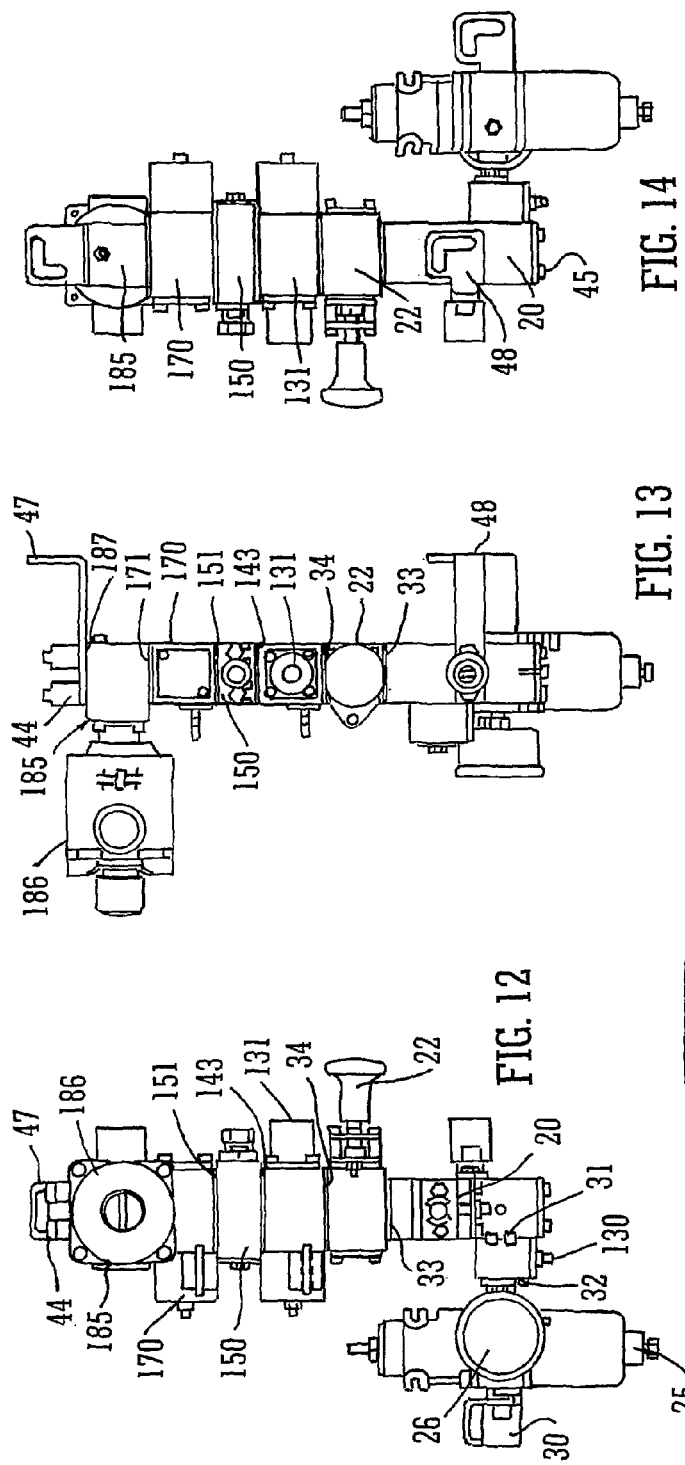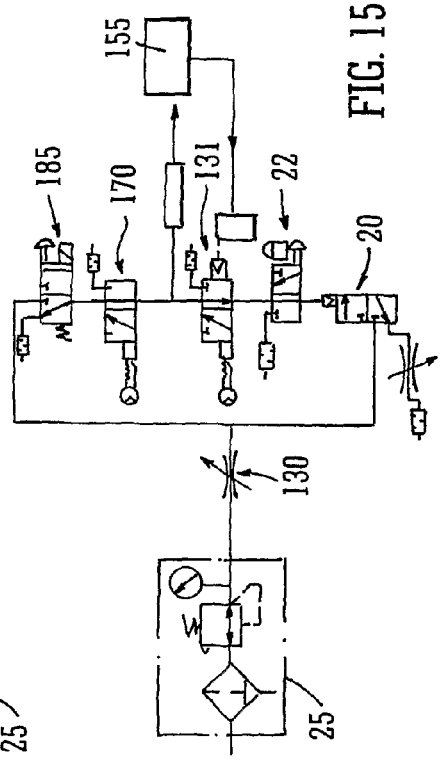
FIG. 14
FIG. 13
FIG. 15
FIG. 12

FLUID FLOW CONTROL APPARATUS

BACKGROUND OF THE INVENTION

The present invention relates to fluid flow control apparatus and more particularly, but not exclusively, to such apparatus that is used to control the flow of pneumatic or hydraulic fluid to a valve actuator.

In many applications it is desirable to automate the actuation of a pipeline valve such as, for example, an emergency shut-down valve, via a remote control system. This is particularly necessary in harsh environments such as, for example, a petrochemical pipeline located on land or off-shore. Such a valve may be of any suitable form such as, for example, a rotary ball valve, a butterfly valve or a gate valve. The actuation of the valve in such a pipeline is often effected by an actuator for controlling the position of the valve by acting on the valve stem. The control fluid is typically pneumatic or hydraulic as there is usually a readily available source at the location. It is supplied to the actuator (or an intervening valve positioner that operates the actuator) via a control valve whose operation is controlled by a fluid pressure pilot signal that is selectively delivered when the status of associated logic control valves allow. Each of the logic valves is connected into the control fluid flow line and is individually controllable manually and/or automatically. The internal configuration of the logic control valves can take any suitable form as can their manner of operation. Examples include solenoid-operated valves, valves that are manually operable by a push-pull plunger, key-operated valves or pilot fluid valves, each of which may be normally open or closed and each of which may be lockable in one or more positions.

The configuration and arrangement of the main control valve and the logic control valves (often referred to as "directional" control valves) in the system is dependent on the particular application and the customer's requirements in terms of safety and the logic conditions that have to be satisfied for operation of the actuator. The valves can be linked together to create many different complex circuits and in view of the large number of valve permutations, the design and manufacture of the control apparatus is generally tailored to meet the specification and requirements of the particular application and is therefore relatively expensive. The installation, servicing, and maintenance of such apparatus also tend to be relatively complex.

It is an object of the present invention to obviate or mitigate the above, and other, disadvantages.

SUMMARY OF THE INVENTION

According to a first aspect of the present invention there is provided fluid flow control apparatus comprising a plurality of stacked valves with one or more intermediate flow-directing plates, the valves comprising a main valve having a housing defining an inlet and an outlet for connection into a fluid flowline and a pilot inlet for receipt of a pilot control fluid from a pilot control fluid flowline, the main valve being operable to open or close the fluid flowline in response to the pilot control fluid pressure, and at least one pilot-operated logic control valve having a housing for connection into the pilot control fluid flowline, the stack of valves having a pilot feed passage for receipt of incoming pilot control fluid, and a pilot return passage that is selectively closable by operation of the logic control valve, the logic control valve being connected to the housing of the main control valve via an intermediate flow-directing plate, the plate being perforated by a first aperture that interconnects the pilot return passage of the logic control valve and the pilot inlet of the main valve.

The apparatus allows for valves to be linked together without the need for complicated and time-consuming manufacturing of valve housings.

The term "pilot" or "pilot control" will be well recognised by the skilled person in the art as indicating that the main valve in question is operable by a supply of pilot fluid that is separate from the main fluid that otherwise passes through the valve and which the valve is intended control. This pilot fluid may be entirely separate from the main fluid flow or may be taken from the main flow upstream of the main valve. One aspect of the present invention is concerned with controlling the pilot flow using logic control valves which are supplied with pilot fluid through the pilot feed passage and return it through a pilot return passage.

The flow-directing plate may be perforated by a second aperture that interconnects the pilot feed passage in the logic control valve and a pilot feed outlet in the main valve.

There may be a plurality of said logic control valves arranged in the stack with an intermediate flow-directing plate between each logic control valve, wherein the pilot feed and return passages extend through all the logic control valves in the stack. Intermediate flow plates between adjacent logic control valves in the stack may interconnect bores in the adjacent valve housings to provide continuity of the pilot feed and return passages between housings. The bores in the adjacent valve housings that define the pilot feed passage may be substantially in alignment throughout the stack whereas the bores that define the pilot return passage in at least one pair of adjacent valve housings may be offset. The aperture in the intermediate flow-directing plate that interconnects the bores in said pair of adjacent housings may extend transversely of pilot return passage.

A common exhaust passage may be defined in the stack by the housing of the, or each, control valve and the, or each, intermediate flow-directing plate, the plate(s) having a third aperture forming part of the exhaust passage. There may be provided an exhaust manifold in the stack, which comprises a housing with an exhaust outlet in fluid communication with the common exhaust passage. An intermediate flow-directing plate may be provided between the exhaust manifold and each control valve.

The stack may be supported by a plurality of elongate tie bars received in bores through the valve housings and plates in the stack, and the pilot feed passage may be defined at least in part by an annular clearance between a wall of a first bore and a first tie bar. The exhaust passage may be defined at least in part by an annular clearance between a wall of a second bore and a second tie bar.

The valve housings may be substantially parallelepiped with upper and lower surfaces, and the tie bars being received in bores that pass through the housings between the upper and lower surfaces. The, or each, flow-directing plate has apertures for receipt of the tie bars aligned with said bores, one of the apertures being said first aperture, each aperture providing an annular clearance between the plate and the respective tie bar.

The, or each, intermediate flow-directing plate between adjacent logic control valves in the stack has at least one first aperture that interconnects the pilot return passage in one control valve to the pilot inlet of the adjacent logic control valve.

The first aperture that interconnects the pilot return passage to the pilot inlet may be elongate and extend substantially perpendicular to the pilot return passage and the pilot inlet.

The, or each, flow-directing plate between adjacent logic control valves may have a second aperture that interconnects the pilot feed passage in one control valve with the pilot feed passage in the adjacent control valve.

An end flow-directing plate may be provided in the stack, distal from the main control valve, and may have an end aperture that interconnects the pilot feed and pilot return passages.

The end aperture that interconnects the pilot feed and pilot return passages may be elongate and may extend in a direction substantially perpendicular to the pilot feed and return passages.

The logic control valve housings in the stack may be substantially identical.

The, or each, aperture in the intermediate flow-directing plate is provided with a sealing ring to seal against leakage of fluid from between adjacent housings in the stack.

A mounting bracket may be provided at an end of the stack distal from the main control valve.

An outlet of the main control valve may be connected to a valve actuator.

According to a second aspect of the present invention there is provided a method for controlling the flow of a pilot control fluid for operating a main control valve, comprising arranging at least one logic control valve in a stack on the main control valve with an intermediate flow-directing plate between the, or each, valve, passing a pilot feed signal through a feed passage in the stack, the feed passage being defined by bores in the valve housings and an aperture in the, or each, plate, redirecting the pilot signal from the feed passage down through a pilot return passage in the stack to a pilot inlet in the main control valve, operating the logic control valve(s) to selectively open or close the return passage in accordance with predetermined requirements.

Thus the status of the control logic valves determines whether the pilot signal that has been fed along the feed passage in the stack is transmitted along the pilot return all the way the pilot inlet in the main control valve. If the returning signal is transmitted all the way to the pilot inlet the main control valve is operated.

According to a third aspect of the present invention there is provided a kit of parts comprising a main control valve, at least one logic control valve and at least one intermediate flow-directing plate for assembly into fluid flow control apparatus as defined above.

According to a fourth aspect of the present invention there is provided fluid flow control apparatus comprising: a control valve that is actuated by a pilot fluid control signal, the control valve having a first housing with a fluid inlet, a fluid outlet and a valve member that is actuable by the pilot fluid control signal to so as to control the flow of a fluid between the fluid inlet and outlet along a main fluid path, the first housing having a pilot inlet for receipt of the pilot fluid control signal; and at least one fluid flow control device connected to the control valve and having a second housing, the first and second housings being connected together by at least one elongate support member that is received in aligned bores defined in the housings, there being a clearance between the peripheral walls of each aligned bore and the at least one elongate support member, the clearance defining a pilot feed path for transmitting the pilot fluid control signal.

According to a fifth aspect of the present invention there is provided a method for a method for controlling the flow of a pilot control fluid for operating a main control valve, wherein the pilot control fluid is directed along a clearance between an elongate support member and a bore in which the member is received, the elongate support member connecting a housing of the main control valve to a housing of at least one other fluid flow control device and the bore being defined in the housings.

According to a sixth aspect of the present invention there is provided a kit of parts comprising a control valve, at least one fluid flow control device and at least one elongate support member for assembly into the fluid flow control apparatus as defined above.

If there is more that one elongate support member there may be a pilot feed path defined by a clearance around only one of those members.

There may be further fluid control devices arranged in a stacked relationship with the control valve, each of the devices having a housing with a bore that is aligned with the bores in the first and second housings, the bore being aligned with the bores in the first and second housings so as to receive the at least one elongate support member and serving to define part of the pilot feed path by means of a clearance between a peripheral wall of the bore and the elongate support member.

The elongate support member may be a bar and may be a tie bar that passes through the bores in the housings.

The fluid control devices may be provided upstream of the control valve and may have passages for transmitting the main flow to the inlet of the main control valve.

There may be provided fluid flow-directing interface seals between the housing and these may be in the form of plates with sealing elements.

At least one interface seal may be configured to provide fluid communication between a main flow path and the pilot feed path.

The fluid control devices may be logic control valves bores arranged to receive pilot signal from a feed passage in the first housing of the main valve. They may also define a pilot signal return path for directing the pilot signal to the pilot inlet of the first housing.

BRIEF DESCRIPTION OF THE DRAWINGS

Specific embodiments of the invention will now be described, by way of example only, with reference to the accompanying drawings, in which:

FIG. 2 is a front view of a first embodiment of fluid control apparatus in accordance with the present invention;

FIG. 3 is a side view of the apparatus of FIG. 2;

FIG. 4 is a rear view of the apparatus of FIG. 2;

FIG. 5 is a diagrammatic representation of the apparatus of FIG. 2;

FIGS. 12 to 14 are, respectively, front, side and rear views of the fluid control apparatus of FIG. 11;

FIG. 15 is a schematic representation of the fluid control apparatus of FIGS. 11 to 14;

DETAILED DESCRIPTION OF THE PREFERRED EMBODIMENTS

Figure 1:
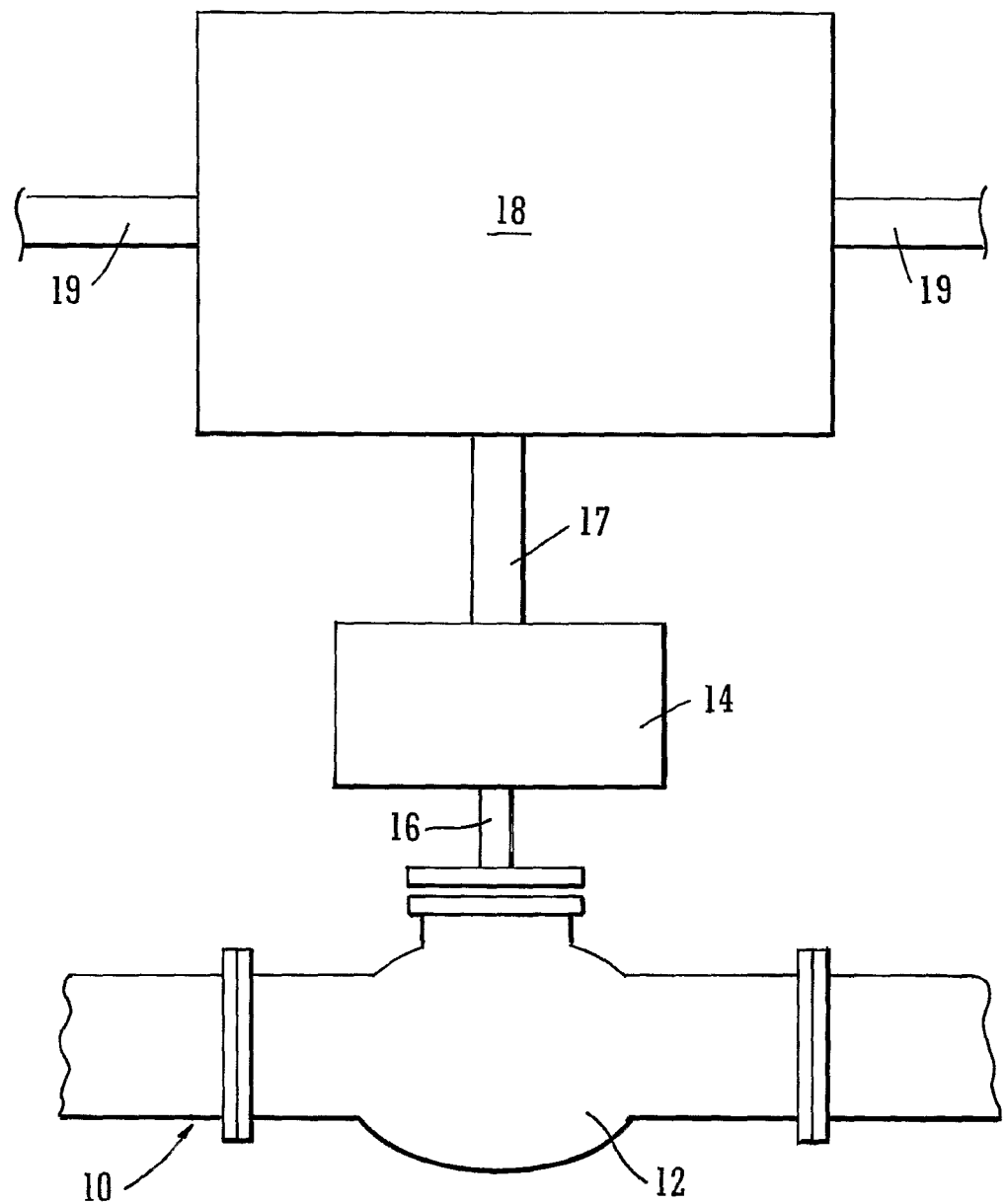
FIG. 1 is a schematic block diagram of a fluid pipeline with a valve actuator connected to a fluid flow control device of the present invention.

Referring now to FIG. 1 of the drawings, a pipeline 10 for carrying oil, petroleum or chemicals is fitted with a valve 12 that is operable between open and closed positions by a pneumatic valve actuator 14. The valve 12 may, for example, be a ball valve that is rotationally disposed within the valve body and has an actuation arm that is moveable by the actuator via a suitable mechanical link 16.

The air is supplied to an outlet 17 of the valve actuator 14 via fluid flow control apparatus 18 that is disposed in a control fluid flow line 19. The apparatus 18, shown in FIGS. 2 to 6, comprises a main stage control valve 20 and two logic control valves 22, 24 connected thereto. It will be appreciated that any suitable number of logic control valves may be used depending on the application. In the embodiment shown in figures the main stage control valve 20 is preceded in the flowline by a pressure regulator 25 (with integral filter and external gauge 26) for ensuring that the flow is maintained at a predetermined pressure. In some applications this may be supplemented with other flow conditioning devices such as, for example, a volume booster that provided a sufficient sustained volumetric flow rate at a given pressure to actuate the valve 12. An example of a combined booster and regulator is described in our co-pending UK patent application No. 0525411.5.

An inlet 30 of the regulator 25 is connected to a supply (not shown) of operating air at unregulated pressure and is delivered to an inlet 31 of the control valve 20 via a flanged connector 32. In the example shown the unregulated inlet air might be as much as 20 bar and the regulated pressure around 5 bar, although it is to be appreciated that any suitable pressure values may be used. The regulated air is selectively transmitted by the control valve 20 to the actuator 14 (via outlet 17) for operating the main pipeline valve 12 depending on the status of the logic valves.

The logic control valves 22, 24 are designed to be of modular configuration, that is, for a given valve kind they each comprise a housing of common design including bores, ports and tappings. There may be several valve families with each member of the family taking the same housing design. For example, a solenoid-operated valve which is generally a poppet valve type may have one housing design and other "junior" valves having a spool type valve (e.g. a key-operated valve, a pilot-operated valve or a manually operated valve) may have a second housing design. The housing designs are such that they can accommodate any appropriate form of internal valve mechanism and any suitable form of external actuator. The valves 22, 24 are vertically stacked on top the main stage control valve 20 with a flow directing plate 33, 34 interposed between each housing. The stack is supported on four tie bars 40, 41, 42, 43 (see FIG. 6), one passing through a respective bore at each of the corners of each housing. The tie bars 40-43 are threaded at each end and held in place by nuts (some capped) 44, 45 at the top and bottom of the stack. In the exemplary embodiment of FIGS. 2 to 6, the stack is supplemented with an exhaust manifold 46 disposed at the top of the stack and a first fixing bracket 47 by which the apparatus is supported in use. A further flow directing plate 35 is sandwiched between the valve 24 and the exhaust manifold 46 and another 36 between the manifold 46 and the bracket 47. A second fixing bracket 48 is disposed at the rear of the main stage control valve 20.

A pilot pressure signal is taken from the inlet 31 of the control valve 20 and transmitted up the stack via a pilot feed passage 50 (represented schematically in FIG. 5) defined by an annular clearance between one of the tie bars 40 and the components in the stack. It will be appreciated that this signal will have been pressure regulated by regulator 25. The signal is returned down through the stack in a return passage via selectively closable pilot inlet ports in the housings to the control valve 20. If all the inlets are open the return pilot signal reaches a pilot inlet 51 to the main control valve 20 and this serves to actuate the valve 20 so that the fluid pressure in the inlet 31 is transmitted to the outlet 17 in order to operate the actuator 14. The pressure of the pilot signal in the example shown in the figures takes the regulated value of 5 bar but it will be understood that it may be of any appropriate value depending on the regulated pressure. An exhaust passage 52 (see FIGS. 7 to 10) is defined through stack in the main by an annular clearance between another of the tie bars 41 and the valve housings. Thus of the four bores at the corner of each housing that are designed to receive the tie bars 40-43, two are used as galleries for the pilot control fluid media and the exhaust media respectively, whilst the other two simply function as mounting bores for the tie bars. Since each valve type has a modular housing with typically three ports on the upper face (for the pilot feed, pilot return and the exhaust) and a single port centrally located on its lower face (continuation of the pilot return), each housing can be rotated through 90° increments into any one of four positions deemed most suitable for the particular application.

Figure 6:
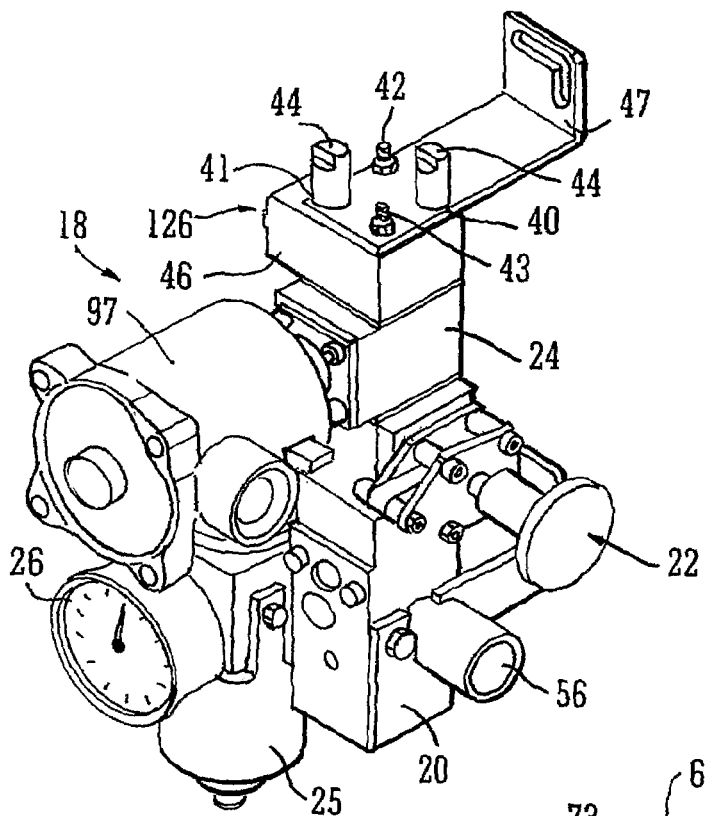
FIG. 6 is a perspective view of the apparatus of FIG. 2.
Figure 7:
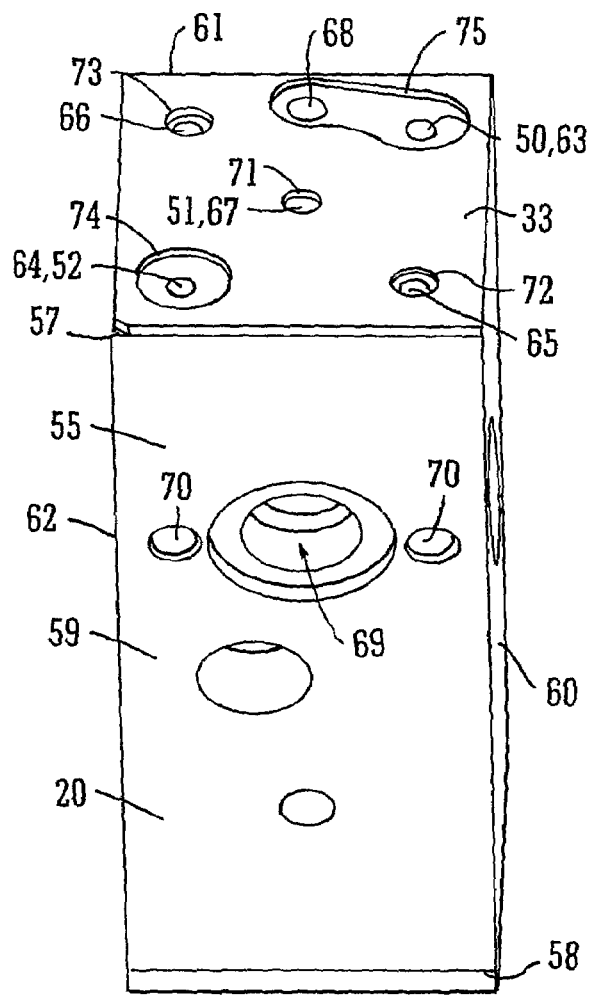
FIG. 7 is a front perspective view of a control valve (with fittings removed) and first fluid-directing plate forming part of the fluid control apparatus of FIGS. 2 to 6.

The main stage control valve 20 is a two-way poppet valve of conventional design, the plug (not shown) of the valve being biased into a normally closed configuration as shown in the schematic representation of FIG. 5. The valve comprises a housing 55 that is fitted externally with an outlet port 56 and a second supporting bracket 48. Referring to FIG. 7, the housing 55 comprises a rectangular block with upper and lower surfaces 57, 58 and four side faces 59-62. The housing is penetrated by four vertical bores 63-66, one proximate each corner, each bore being designed to receive a supporting elongate tie bar 40-43 (FIG. 6). In addition to these four bores 63-66 the upper surface 57 of the housing 55 is penetrated by a central bore 67 providing a pilot inlet 51 for the returning pilot signal, and by a pilot feed outlet 68. The pilot feed inlet 51 is connected to the valve interior and transmits the returning pilot signal to the valve plug so as to operate it. The pilot feed outlet 68 is in communication with the valve inlet 31 (FIG. 2) and so receives the regulated pilot signal for onward transmission up the stack via the pilot feed passage 50. The front side face of the valve is penetrated by an exhaust port 69 that in use will be covered by a filter mesh (referred to as a "bug vent") for keeping out small insects, dirt and the like. The tapped bores 70 that flank the exhaust port provide fixing points for the mesh.

Figure 8:
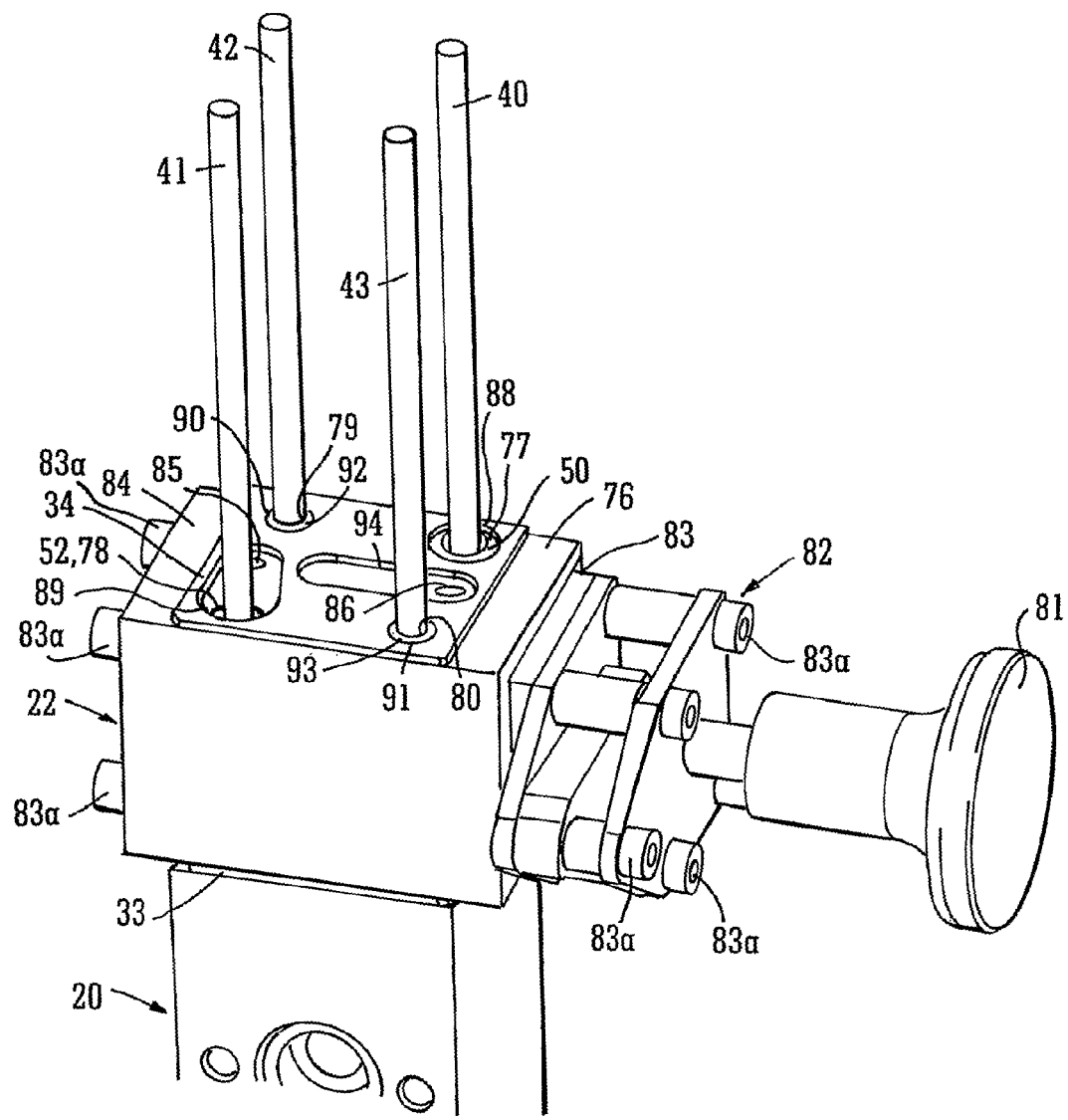
FIG. 8 is a front perspective view of part of the control apparatus of FIGS. 2 to 7 showing a plunger-operated logic control valve with a second fluid-directing plate mounted thereon and supporting studs.
Figure 9:
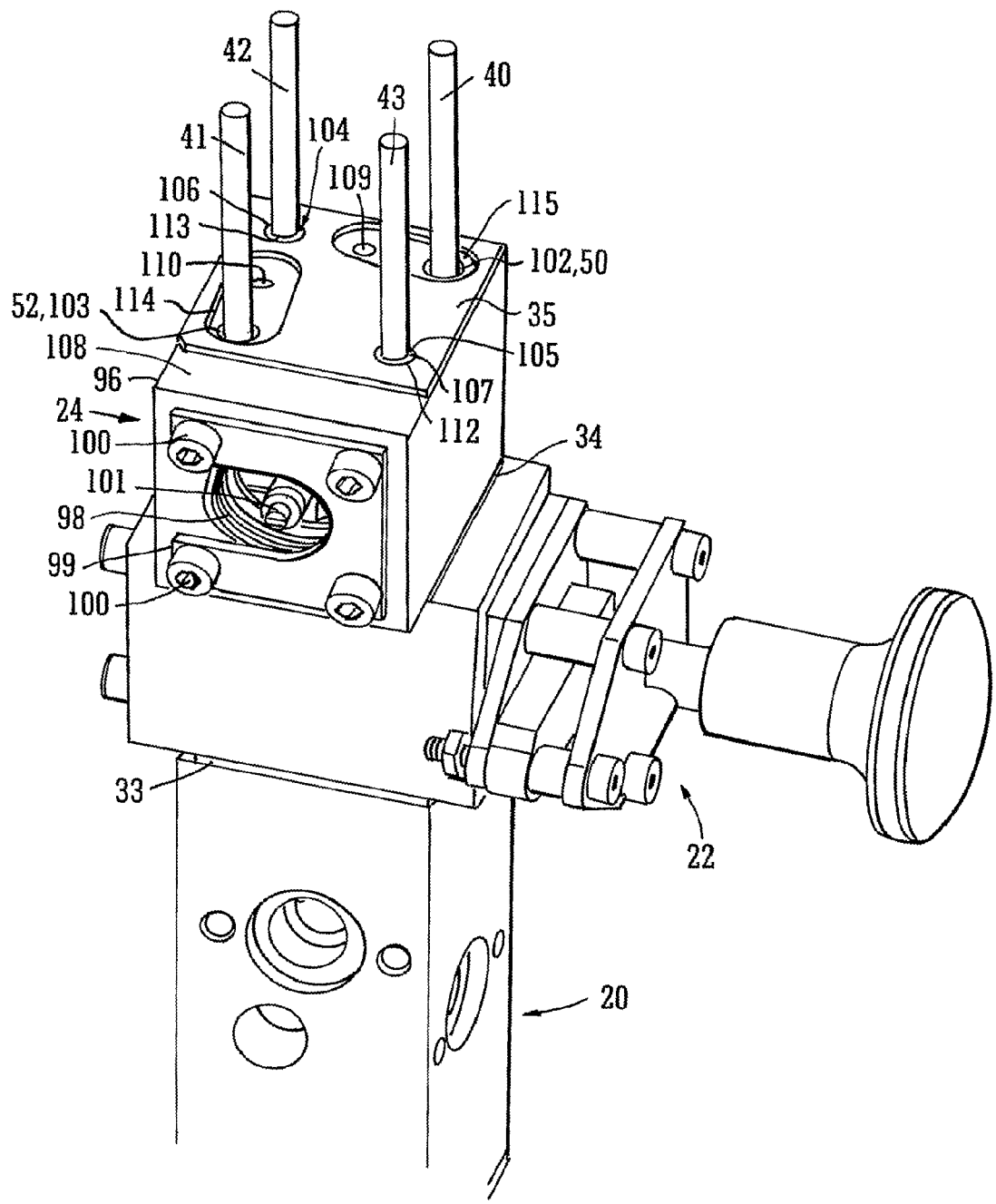
FIG. 9 is a front perspective view of part of the control apparatus of FIGS. 2 to 8 showing a solenoid-operated logic control valve with a third fluid-directing plate mounted thereon and the supporting studs, but with the solenoid removed for clarity.

A first flow-directing plate 33 is interposed between the upper surface 57 of the main stage control valve housing 55 and the lower surface of the next component in the stack: a plunger-operated logic control valve 22, which is shown in FIG. 8. The plate 33 is shown supported on the upper surface 57 of the main stage control valve in FIG. 7 with its edges coterminous with the side faces 59-62 of the valve housing 55 and has apertures 71-75 that overlie the bores defined on the upper surface of the main stage control valve 20. A central aperture 71 is in alignment with the pilot inlet bore 67 and is substantially of the same diameter. Two diagonally opposite slightly larger apertures 72, 73 overlie the two tie bar bores 65, 66 with a small annular clearance. A larger circular aperture 74 overlies the exhaust bore 64 and serves as one end of the exhaust passage 52. An elongated aperture 75 extends between the pilot feed outlet bore 68 of the housing 55 and bore 63 so as to permit fluid communication between the feed outlet and the start of the feed passage 50. Each aperture 71-75 in the plate 33 is fitted with a sealing ring (not shown) that sits inside the aperture periphery and prevents leakage of fluid out of the apparatus.

The plunger-operated valve 22 (shown in detail in FIG. 8) has a standard logic control valve housing 76 that is generally parallelepiped and penetrated by the four corner bores 77-80 for receipt of the supporting tie bars 40-43. The exterior of the housing 76 is fitted with a manually operated knob 81, an associated linkage 82 and an interface plate 83 and fixings 83a, all of conventional design. It can be seen from the diagrammatic representation of the circuit in FIG. 5 that the valve 22 is normally open two-way valve and is closed by pushing on the knob 81. The valve is lockable in the open or closed positions. The upper surface 84 of the valve housing 76, in addition to the four tie bar bores 77-80, is penetrated by an exhaust port 85 and a pilot inlet bore 86. FIG. 8 shows the plunger-operated valve 22 with the second intermediate flow-directing plate 34 supported thereon. The plate 34 has four corner apertures 88-91 for receipt of the supporting tie bars 40-43. Two of the apertures 90, 91 (circular) are redundant in that they communicate with the two tie bar bores 79, 80 that do not transmit fluid in this arrangement and are therefore lined with spacers 92, 93 to take up the annular clearance. A third of the corner apertures 88 is circular, slightly larger and in communication with the pilot feed passage 50, whereas the fourth aperture 89 is elongated and permits communication between the exhaust port 85 of the underlying housing 76 and the exhaust passage 52. Finally, there is another elongate aperture 94 that extends from one edge of the plate 34 above the pilot inlet 86 for the valve 22 to the plate centre, which is where the returning pilot signal will be incident from the component that is next in the stack. As before, the active apertures 88, 89, 94 in the second intermediate plate 34 will be lined with sealing rings that correspond in shape to that of the apertures.

The next component in the stack is a solenoid-operated logic control valve 24. The valve housing 96 is of a second standard housing configuration and is rotated through 90° in comparison to the preceding valve 22. An externally mounted solenoid 97 (shown in FIGS. 2 to 4 and 6, but removed in FIG. 9 for clarity) is supported on the housing 96. This valve is two-way and normally closed as shown in the diagrammatic representation of FIG. 5. The housing 96 has an opening 98 for receipt of the internal components (not shown) of the valve and is fitted with an interface plate 99 that is secured in place with four bolts 100. A stem 101 of the valve member protrudes towards said plate 99 and is configured for connection to the solenoid 97. The housing 96 is again penetrated by the four corner bores 102-105 that receive the supporting tie bars 40-43. The two bores 104, 105 that are not transmitting fluid pressure are lined at least in part with spacers 106, 107 as before, whereas the other two bores 102, 103 form part of the pilot feed passage 50 and the exhaust passage 52 that penetrate the stack. The upper surface 108 of the valve housing 96 additionally has a pilot inlet bore 109 and an exhaust outlet bore 110. The third intermediate fluid-directing plate 35 is shown supported on top of the housing 96 in FIG. 9 and comprises two corner apertures 112, 113 for receipt of the tie bars 43, 42 and spacers 107, 106 and two elongate apertures 114, 115 that extend in a direction substantially perpendicular to the pilot feed and exhaust passages 50, 52. A first elongated aperture 114 extends from the exhaust bore 110 in the housing 96 and directs exhaust fluid to the exhaust passage 52 for upward transmission. The second elongated aperture 115 interconnects the pilot feed passage 50 with the pilot inlet bore 109 for the solenoid-operated valve 95 and thus redirects the pilot feed fluid downwardly along its return path through the stack. Again, each of the active apertures 114, 115 in the plate 35 is lined with a complementary sealing ring (not shown).

Figure 10:
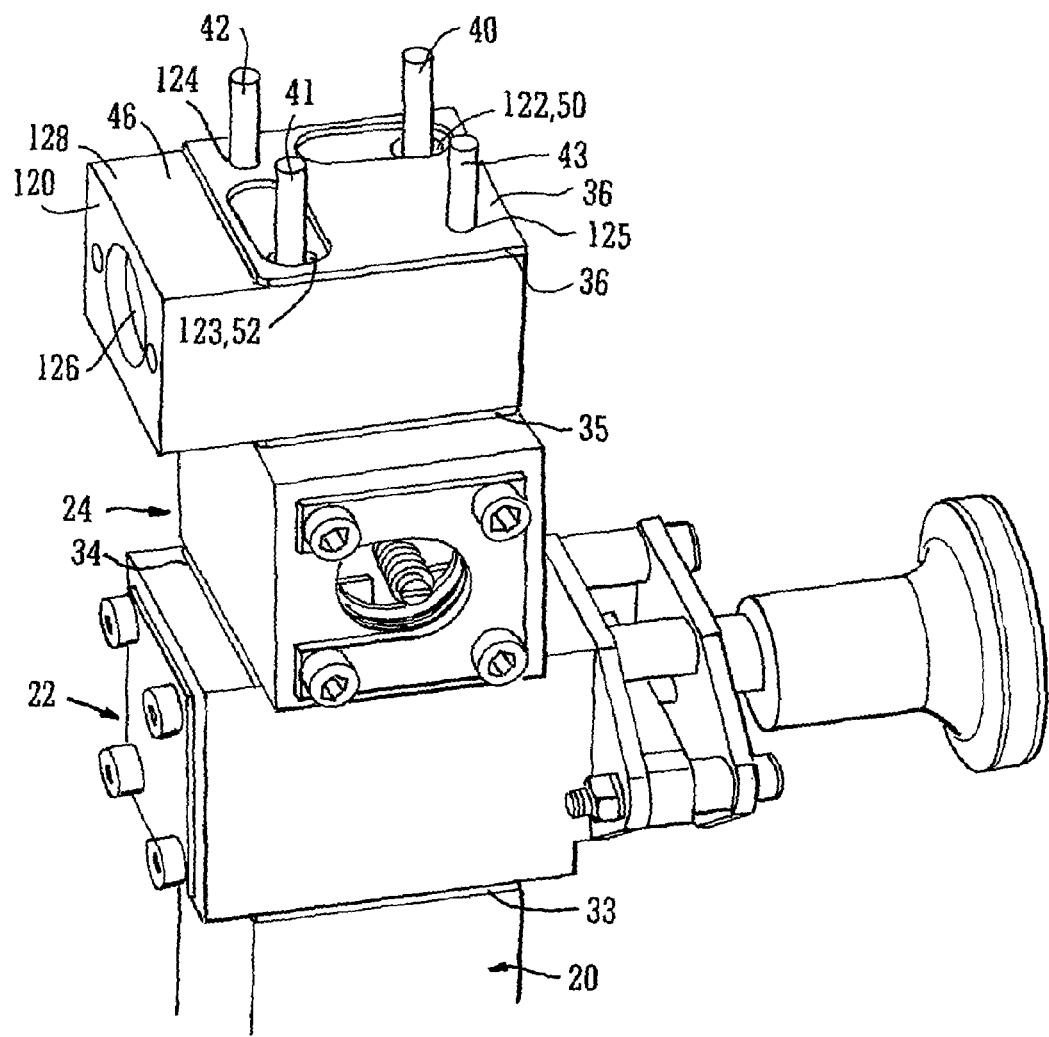
FIG. 10 is a front perspective view of part of the control apparatus of FIGS. 2 to 9 showing an exhaust manifold, a fourth fluid-directing plate mounted thereon and the supporting studs.
Figure 11:
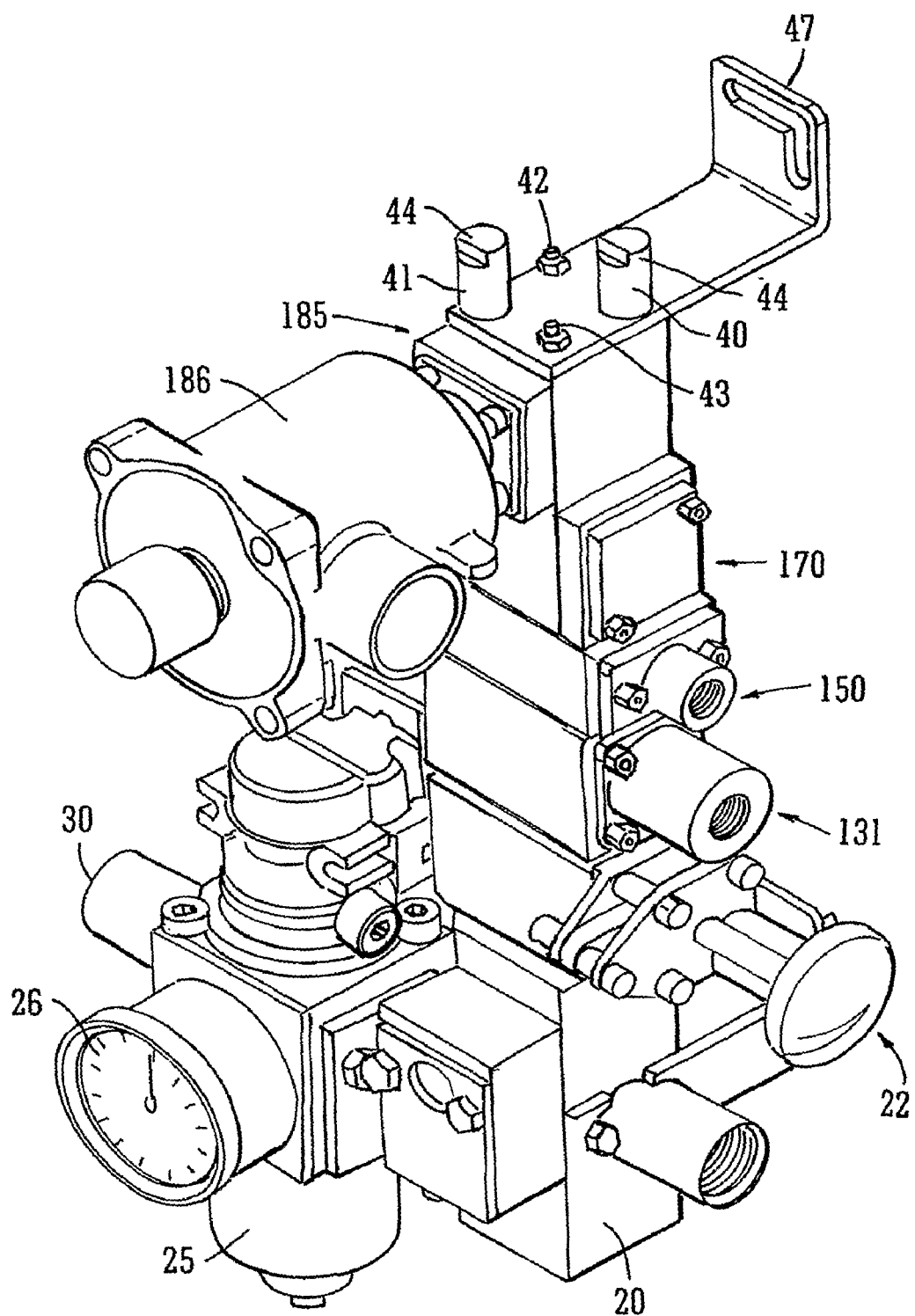
FIG. 11 is a perspective view of a second embodiment of fluid control apparatus in accordance with the present invention.
Figure 16:
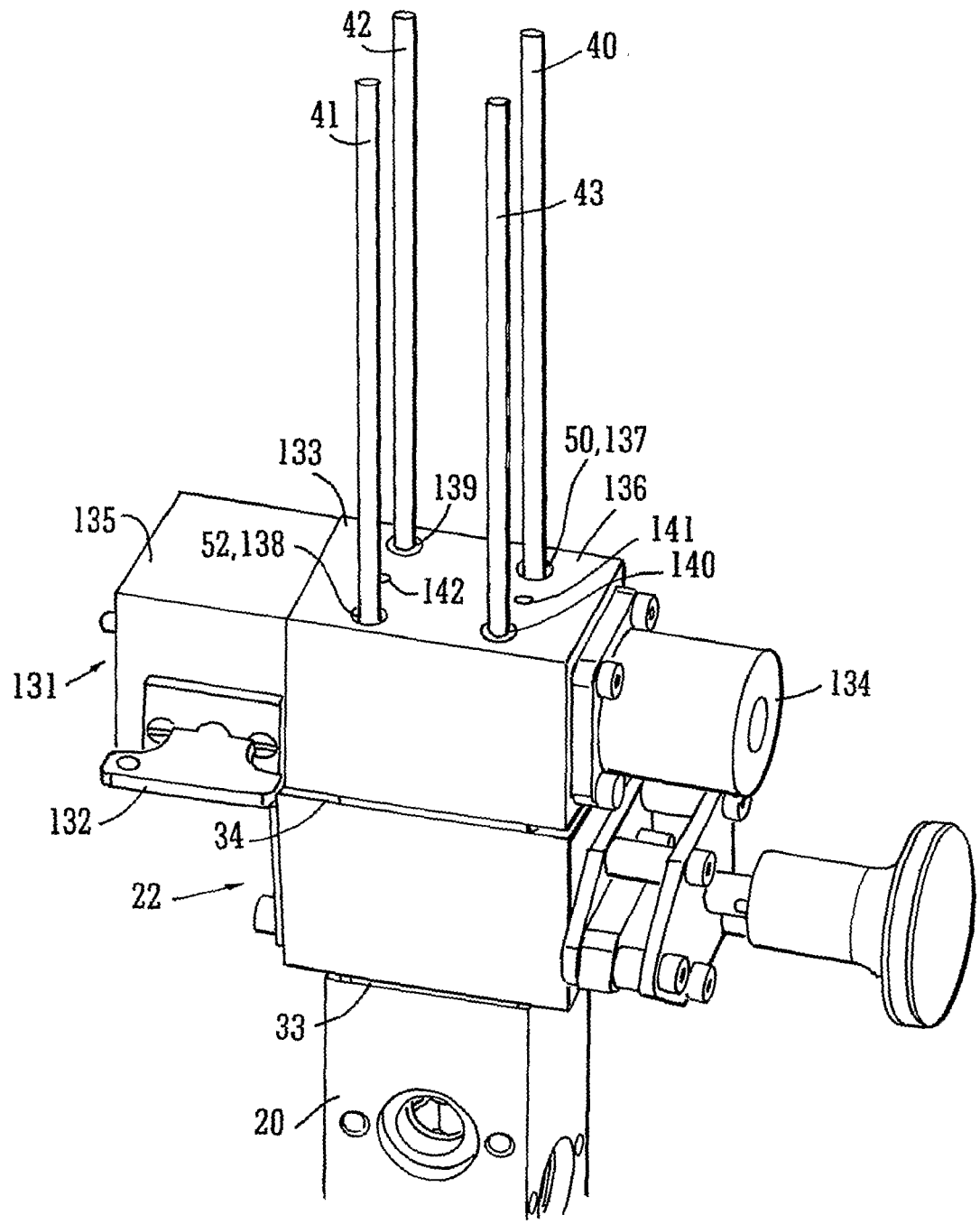
FIG. 16 is a perspective view of part of the control apparatus of FIGS. 11 to 15 showing the first two logic control valves in the stack and supporting studs.
Figure 17:
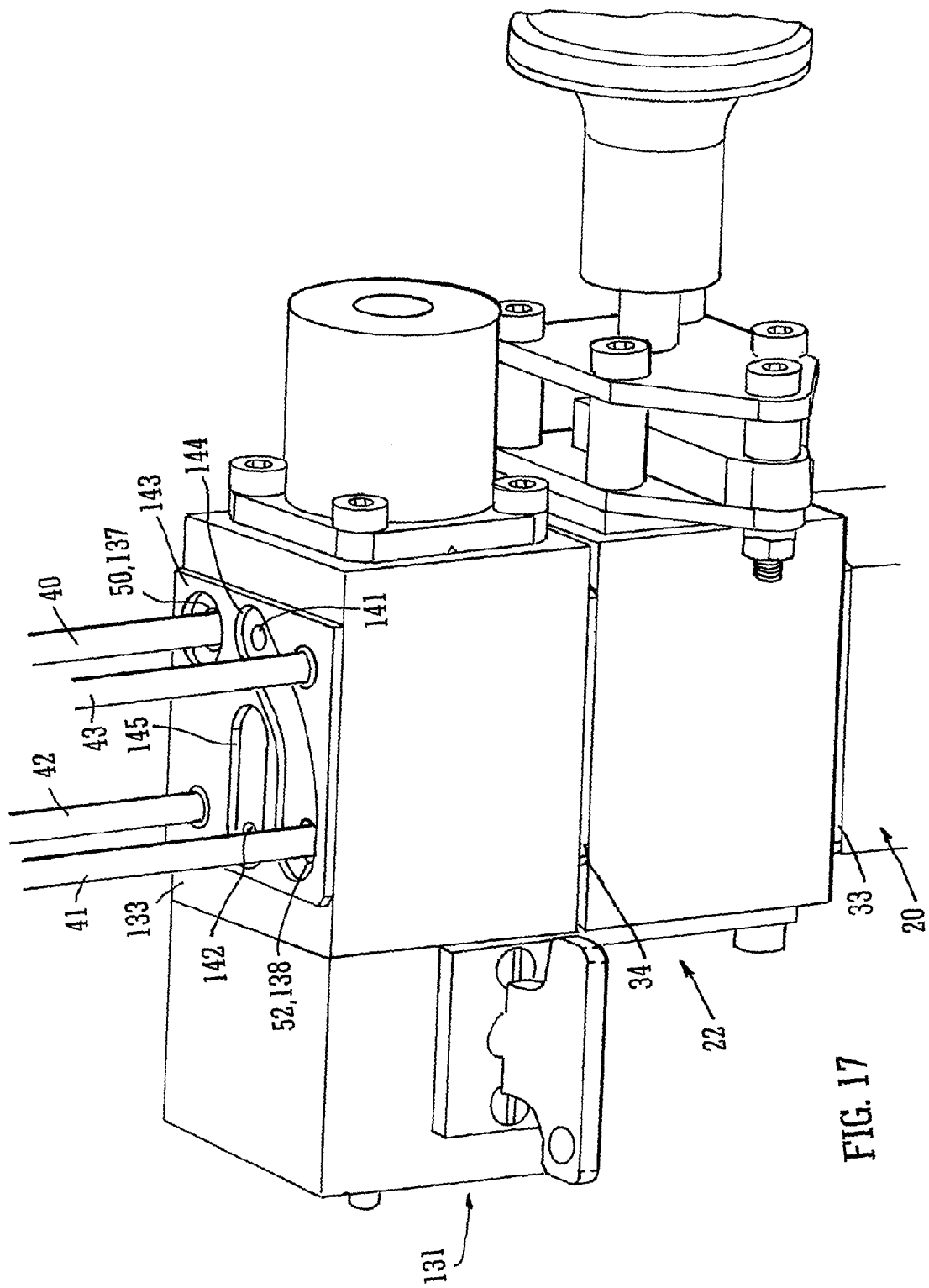
FIG. 17 is a perspective view of part of the control apparatus of FIGS. 11 to 16 showing a third flow-directing plate.

The exhaust manifold 46 is disposed in the stack immediately above the third plate 36, as depicted in FIG. 10. Its housing 120 is different from that of the logic control valves 22, 24 but is penetrated by the usual four bores 122-125 for receipt of the four tie bars 40-43. It is designed to receive the exhaust fluid from all of the components in the stack and provides a single exhaust port 126 to atmosphere. It has an internal passage (hidden) that interconnects the exhaust passage 52 in the stack and the exhaust port 126, which in practice is covered by a bug vent mesh. The upper surface 128 of the exhaust manifold housing 120 supports a final plate 36 and sealing rings (not shown) that simply seal the stack to the bracket (shown in FIGS. 2 to 4 and 6) 47. This plate 36 is identical to the third fluid-directing plate 35 but does not provide any communication between the bores 122-125 in the exhaust manifold 46.

It will be understood from the above that the fluid control apparatus comprises a modular system of logic control valves 22, 24 whereby each valve type has a common housing design and can be arranged in a stacked configuration above a main stage control valve 20 with intervening plates 33 to 36 that are custom made with an arrangement of apertures to direct fluid flow in the required manner between the housings 55, 76, 96, the main stage control valve 20 and an exhaust manifold housing 120. This significantly reduces the manufacturing and design costs as it allows a simplified standard housing design to be used for each logic control valve 22, 24. Each housing is simply fitted with the internal valve members and external actuator mechanisms and the stack is interleaved with the fluid directing plates 33-36 of appropriate configuration for redirecting the flow. The plates serve to distribute the returning pilot signal from the bottom face of an upper valve to an upper face of the lower valve in the stack. They also serve to distribute fluid to and from the exhaust and pilot feed passages. It will be readily appreciated that the manufacture of a few bespoke plates is much simpler than having to manufacture a set of bespoke valve housings. The plates also afford the possibility of easy sealing between the housings by allowing the locating of standard O-ring seals of various materials, hardness and shape to suit both the pilot fluid media and the operating temperature. The arrangement also allows for a common exhaust passage 52 to be provided in the stack so that all exhaust gas can be directed to a common exhaust manifold 46 rather than having to provide exhaust ports in each housing. In an alternative configuration (not shown) the exhaust manifold can be omitted and the exhaust gas can be vented to atmosphere through the first bracket 47

In practice only a relatively small number (e.g. 10-15 or so) of plate designs may be developed to cover most practical permutations of logic control valve housings in a stack. The ability to provide a standard housing and a limited range of plates obviously has beneficial implications for stock control.

The arrangement is made possible, amongst other things, by directing the pilot feed signal from the main stage control valve 20 through a feed passage 50 in the stack and returning it selectively through the pilot inlet ports 109, 86, 51 of each of the logic control valves 22, 24 and the main stage control valve 20 in succession.

The feed passage 50 and the exhaust passage 52 can penetrate the stack without having to pass through internal valve arrangement within each housing.

The tie bars 40-43 may be of any diameter to suit the particular application or may be of any length to suit the number of logic control valves in the fluid circuit.

The logic control valve housings may be rotated through 90° relative to one another in the stack to suit the particular application and to avoid interference of the externally fitted valve actuators (e.g. solenoid 97 or plunger knob 81) so that their operation is not compromised. Moreover, the plates are designed so that they may be oriented in any one of four positions relative to a given housing. This is made possible in particular by ensuring that all four of the corner apertures in each plate afford an annular clearance around the tie bars 40-43 so that any of the apertures may serve as part of the exhaust or pilot feed passages 52, 50.

The flowline fluid (and therefore the pilot feed control fluid) may be hydraulic (any suitable gas or liquid) or pneumatic.

The above described arrangement effectively removes the logic control valves 22, 24 from the main pneumatic or hydraulic flow line 19 and as a consequence the internal bores in the housings may be made smaller in comparison to conventional designs.

It will be appreciated that the device can be provided in a range of sizes to suit all applications and that all components including seals can be designed to operate at extreme temperatures such as those found in arctic conditions.

A second exemplary embodiment of the control apparatus is shown in FIGS. 11 to 20. As for the figures of the first embodiment the sealing rings in the flow-directing plates are not shown. Components that are common to the embodiment of FIGS. 2 to 10 are given the same reference numerals.

The regulator 25, main stage control valve 20 and the first three components in the stack (the first and second flow-directing plates 33, 34 and the plunger-operated logic control valve 22) are identical to those in FIGS. 2 to 10 and will be described no further. A flow control device 130 of conventional design for providing an adjustable volumetric flow rate is provided intermediate the regulator 25 and the main stage valve inlet 31. The stack is supported by the same arrangement of four elongated tie bars 40-43 that pass through bores that penetrate each component in the stack including the main stage control valve 20 and the intervening flow-directing plates. The tie bars 40-43 are again secured in place by nuts 44, 45 at each end of the stack and fixing brackets 47, 48 are again provided at the top and at the rear of the main stage control valve 20 to secure the stack in-situ.

The next component in the stack above the second plate 34 is a key-operated pilot fluid operated logic control valve 131 (best viewed in FIG. 16) that is normally open and can only be closed (and vented to the exhaust passage) when a key 132 is actuated. Receipt of a test pilot signal (which is different to the pilot feed and return signals) opens the valve. The valve housing 133 is fitted externally with a test pilot inlet port 134 on one side face and a housed key mechanism 135 on the opposite side. The upper surface 136 of the housing 133 has the usual four corner bores 137-140, an exhaust outlet 141 towards the test pilot inlet side and the usual pilot inlet 142 for the returning signal towards the key side. The third flow-directing plate 143 (FIG. 17) has a first elongate arcuate aperture 144 that extends transversely from the exhaust outlet 141 of the housing 133 to the common exhaust passage 52 and a second elongate aperture 145 that again extends transversely and provides fluid communication between the returning feed signal (emanating from the component in the stack that is immediately above) and the pilot inlet 142 of the valve housing 133.

Figure 18:
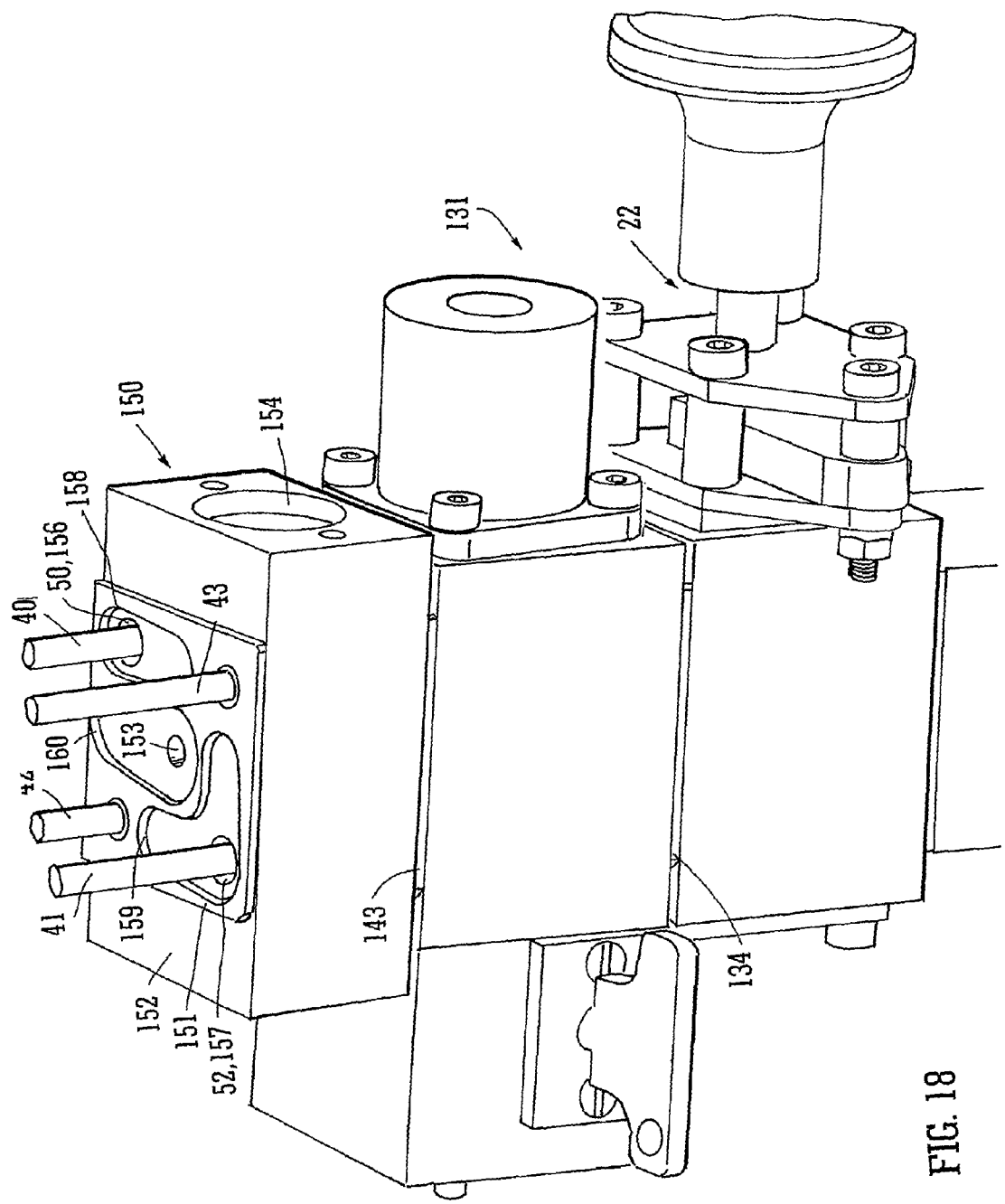
FIG. 18 is a perspective view of part of the control apparatus of FIGS. 11 to 17 showing an exhaust manifold and a fourth flow-directing plate.

FIG. 18 shows an exhaust manifold 150 disposed over the third plate 143 and a fourth flow-directing plate 151 mounted on the upper surface 152 of the manifold 150. The manifold housing is penetrated in the same way as that (120) of the first embodiment but with a central bore 153 through the housing to allow for passage of the returning pilot signal. The exhaust outlet 154 of the manifold 150 is connected to a roller cam mechanism 155 (shown only in the schematic diagram of FIG. 15) of conventional design that is used for testing purposes and has an outlet that supplies the test pilot signal for the preceding control valve 131 in the stack. The manifold housing is penetrated by the usual four corner bores 156-159 for the tie bars 40-43, with bores 156, 157 forming part of the pilot feed passage 50 and the exhaust passage 52. The fourth flow-directing plate 151 does not serve to redirect flow of the pilot or exhaust fluids and simply provides a sealing function. The elongated apertures 158, 159 in the plate 151 that are in communication with the pilot feed and exhaust passages 50, 52 serve no purpose in this instance but may be functional when the plate is used 151 in a different position in a stack. An elongate transverse aperture 160 extends from a rear edge of the plate 151 to the centre and serves to redirect the returning pilot flow to the central bore 153 in the manifold.

Figure 19:
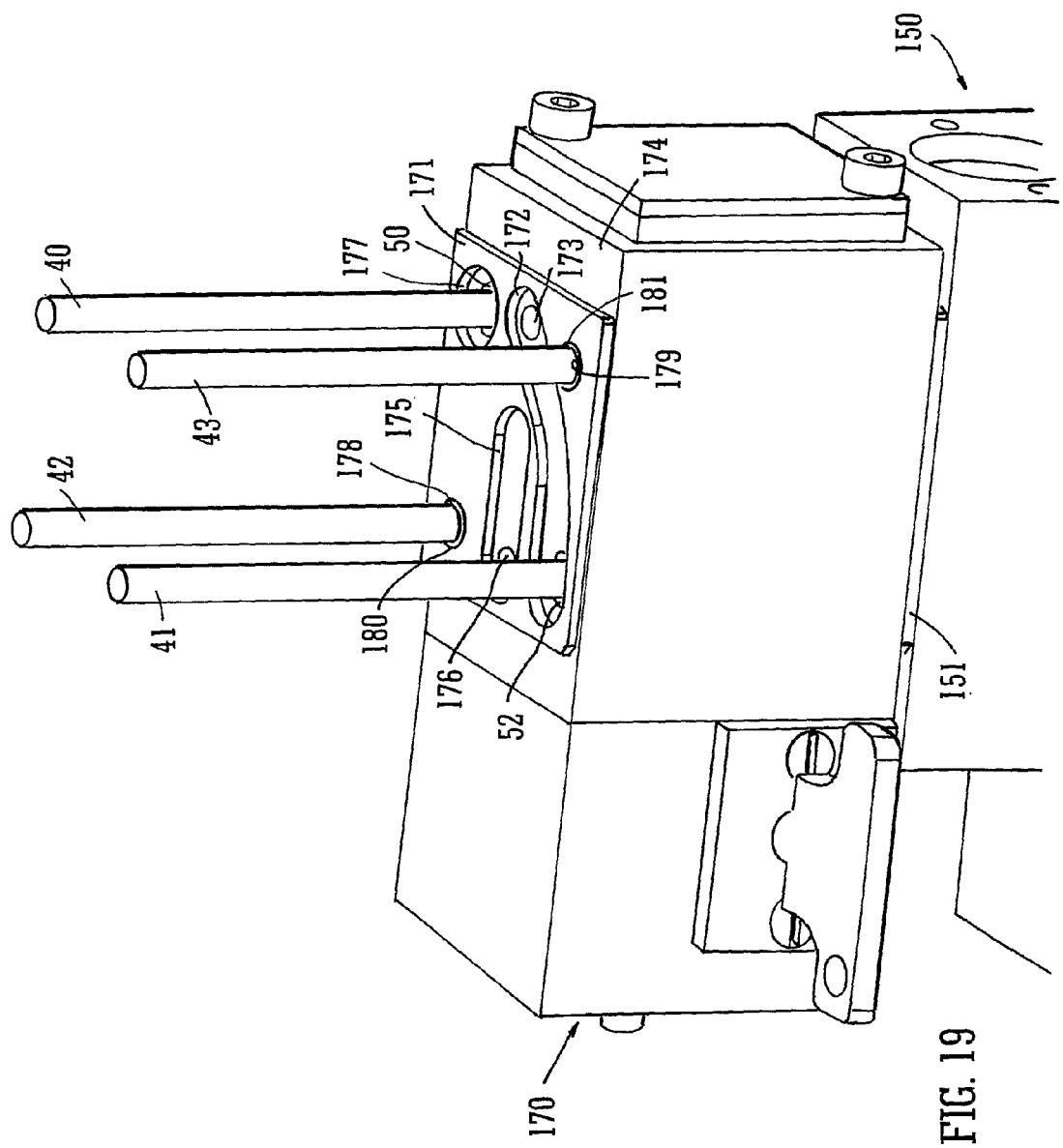
FIG. 19 is a perspective view of part of the control apparatus of FIGS. 11 to 18 showing a third logic control valve in the stack and a fifth flow-directing plate.
Figure 20:
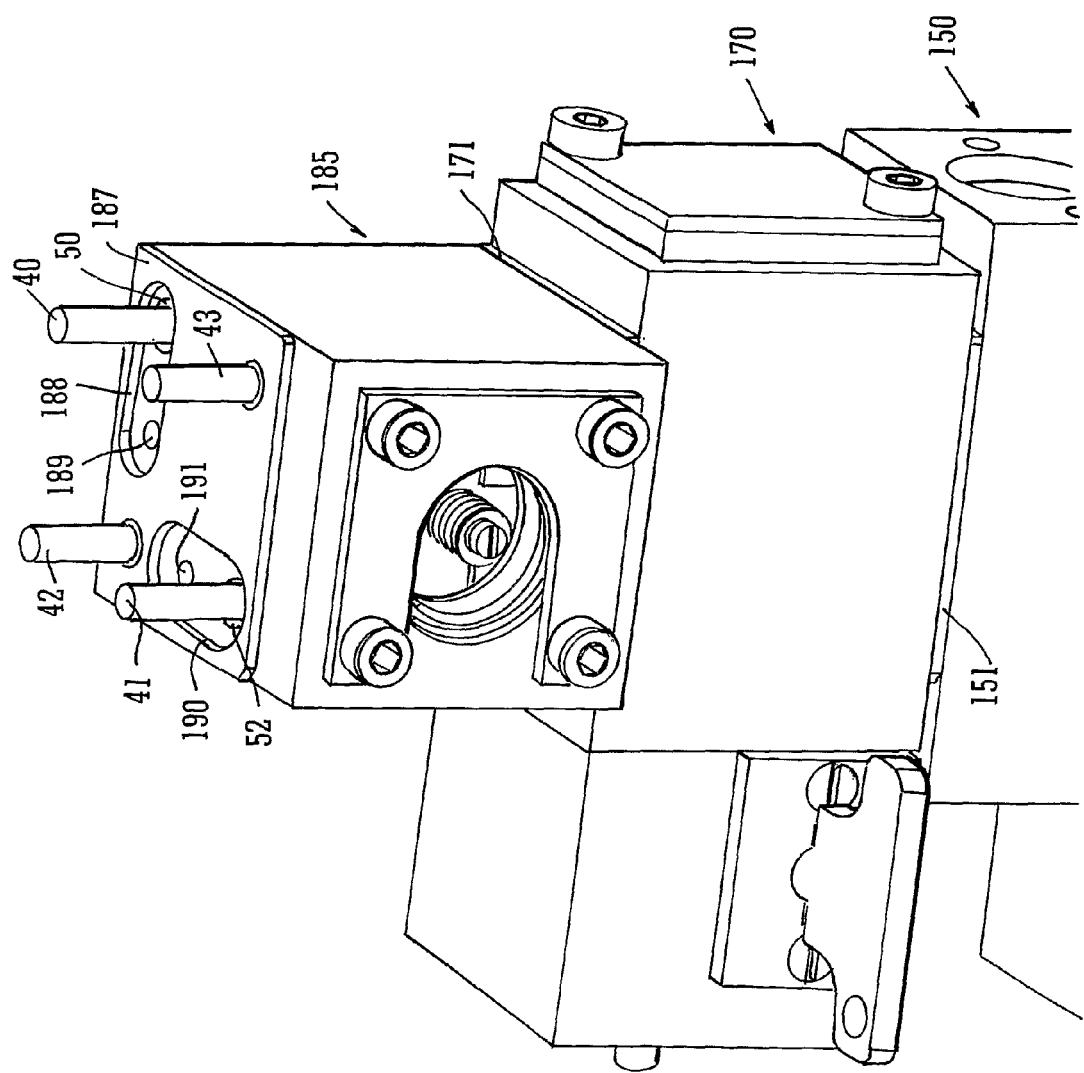
FIG. 20 is a perspective view of part of the control apparatus of FIGS. 11 to 19 showing a fourth logic control valve in the stack and a sixth flow-directing plate.

The next valve in the stack, shown most clearly in FIG. 19, is another key-operated logic control valve 170, which again has a two-way normally open configuration but has no separate test pilot inlet port in this instance. The fifth intervening plate 171 immediately above the valve 170 has an elongate arcuate aperture 172 that provides communication between an exhaust outlet 173 from one side of the upper surface 174 of valve housing and the common exhaust passage 52 and extends in a direction transverse to the passage 52. The plate 171 also defines shorter elongate aperture 175 that directs the return pilot pressure signal from the centre to a pilot inlet 176 to the valve 170 on the key mechanism side. The usual additional circular apertures 177, 178, 179 are provided in the plate 171 (and the valve housing) to accommodate the tie bars 40-43 with a clearance. As before, spacers 180, 181 take up the redundant clearances around tie bars 42 and 43.

The stack is topped by a normally closed, solenoid-operated logic control valve 185 (the solenoid 186 being shown in FIGS. 11 to 14 but removed in FIG. 20 for clarity) of the same kind as described above in relation to the first exemplary embodiment of the present invention. The final flow-directing plate 187 has a first elongate aperture 188 that extends in parallel to the rear edge of the plate from the feed passage 50 to an inboard pilot inlet 189 in valve 185, thus providing the start of the return pilot flow. A second elongate aperture 190 extends in a perpendicular direction towards a side edge and provides fluid communication between an exhaust outlet 191 in the valve housing and the common exhaust passage 52.

Figure 21:
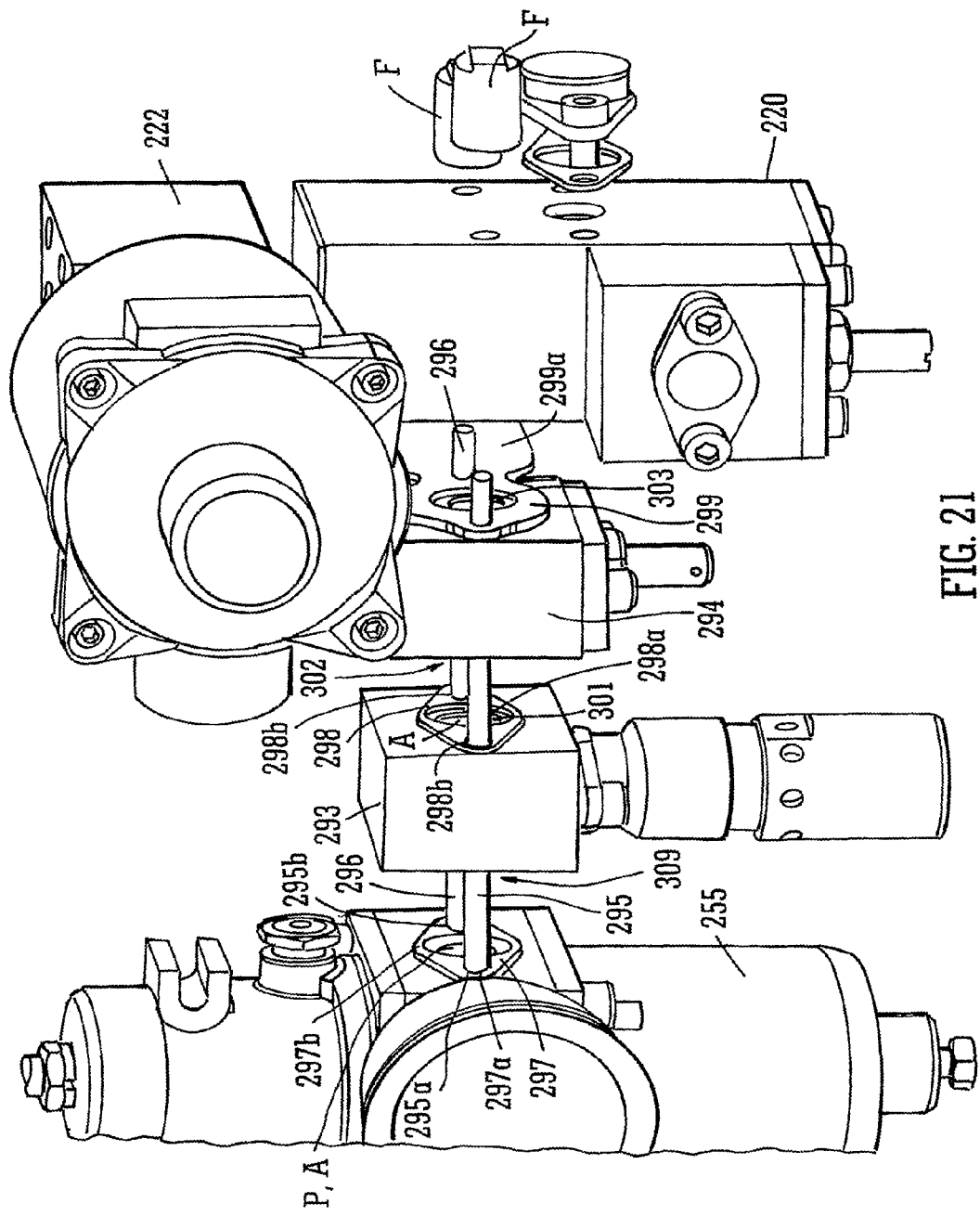
FIG. 21 is an exploded perspective view of a third embodiment of flow control apparatus in accordance with the present invention.
Figure 22:
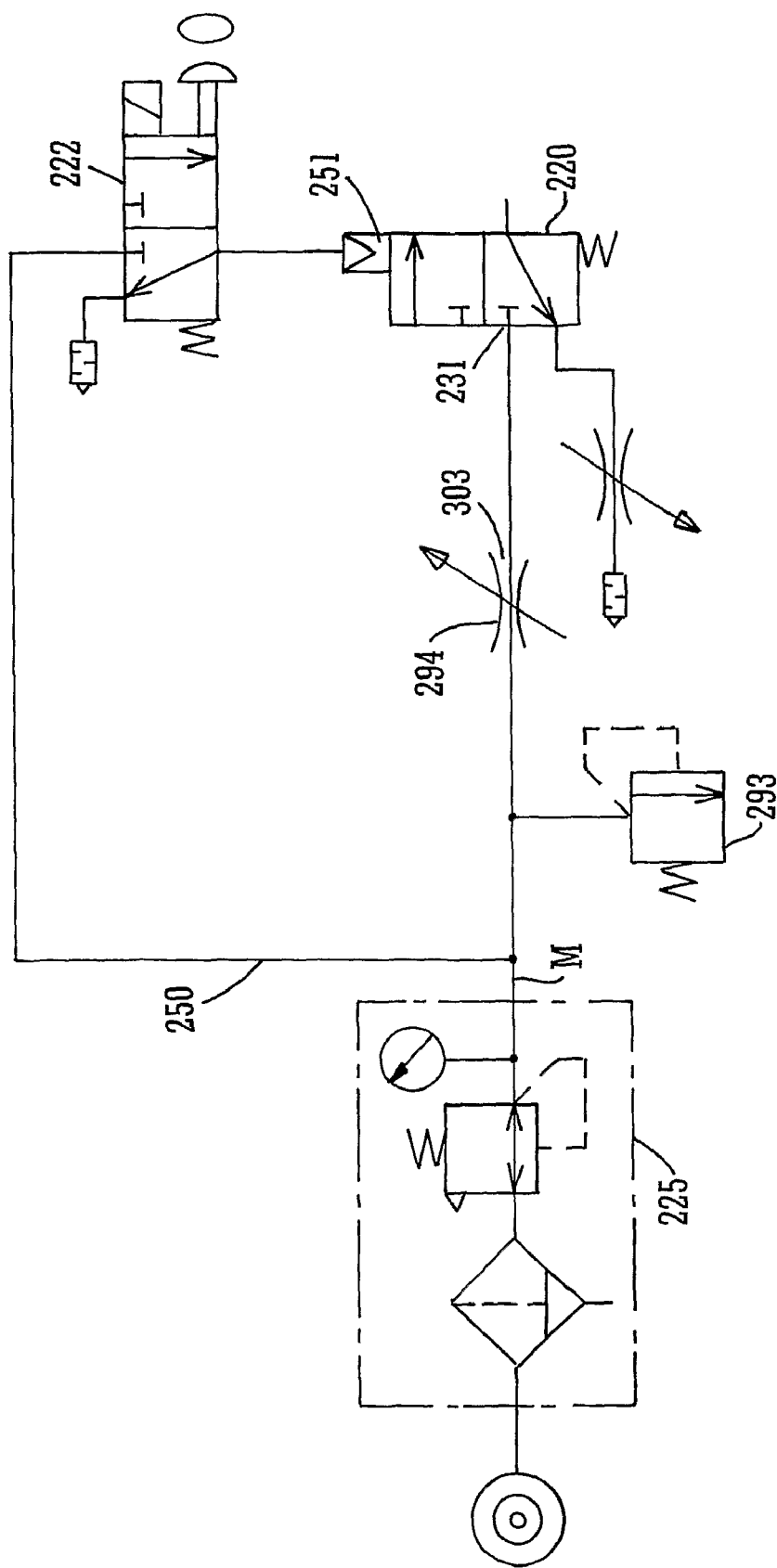
FIG. 22 is a diagrammatic representation of the hydraulic circuit provided by the components shown in FIG. 21.

In the alternative embodiment of the present invention shown in FIGS. 21 and 22 the main stage control valve 220 has only one logic control valve 222, although it will be understood, however, that any number of logic control valves may be provided. Both the valves are substantially identical to their counterparts described above in relation to FIGS. 1 to 20 and are not therefore further described in any detail. Components that are common to the embodiment of FIGS. 1 to 10 are given the same reference numbers as their counterparts but increased by 200. This particular embodiment illustrates that the ideas of using flow-directing interface plates between components and directing the pilot feed signal along a clearance between the tie bar and a housing bore in which it is received can be extended to the main flow line. A pressure regulator 225 (with integral filter and external gauge) precedes the main stage control valve 220 as before and ensures that the main flow is maintained at a predetermined pressure. In contrast to the previous embodiments, additional components are interposed between the regulator 225 and the main stage control valve 220. In the embodiment of FIGS. 21 and 22 there is a pressure relief valve 293 and a flow control valve 294. Tie bars 295, 296 are used to support the components in the main flowline in the same manner as the logic control valves of the preceding embodiments. In the embodiment shown a pair of substantially parallel tie bars 295, 296 extend through bores 295a, 295b in the pressure regulator 225, the pressure relief valve 293, the flow control valve 294 and the main stage control valve 220. For the valve housings, there is a clearance between the surface of second tie bar 296 and the walls that define the bores 295a, 295b in which it is received so as to provide a passage along which a pilot flow signal can be directed as is described below.

A flow directing interface plate 297, 298, 299 is disposed between the housings of each component and these are configured to separate a pilot feed flow 250 from the main flowline M and to direct it to the main stage control valve 220. The housings of the components are arranged on the tie bars 295, 296 in a stacked arrangement. In FIG. 21 they are shown in exploded from for clarity but in practice the housings are in very close proximity to one another. Each of the housings of the components is penetrated by a main flow passage A that carries fluid flow between the regulator 225 and the main stage control valve 220. In particular, the housing of the pressure relief valve 293 is penetrated by a passage that extends between an inlet port (hidden from view but indicated generally by arrow 300) and an outlet port 301 and similarly the housing of the flow control valve 294 is penetrated by a flow passage that is aligned with that of the relief valve 293 and extends between an inlet port (again hidden from view but indicated by arrow 302) and an outlet port 303. The regulator 225 has an outlet port P that is immediately adjacent to the inlet port 300 of the pressure relief valve 293 and the main stage control valve 220 has an inlet port 231 that is immediately adjacent the outlet port 303 of the flow control valve 294.

The first interface plate 297 between the regulator and the pressure relief valve is a thin member with a generally lozenge shaped outline and has two apertures. A first circular aperture 297a is designed to receive a first of the tie bars 295 and the second is a larger aperture 297b that not only affords fluid communication between the regulator outlet port P and the inlet 300 of the relief valve 293 but also extends laterally so as to provide fluid communication between the outlet port P and the bore of the pressure relief valve 293 in which the second tie bar 296 is received. This arrangement allows a portion of the main fluid flow to directed along the clearance between the second tie bar 296 and the respective housing bores to serve as a pilot feed pressure signal. The feed signal is delivered to pilot feed path in the main stage control valve 220 from where it is transmitted to the logic control valve 222 as in the preceding embodiments. Suitable seals are provided in each aperture of the plate 297 to prevent leakage of the fluid between the housings. It will be appreciated that the plate itself may be manufactured from a suitable sealing material rather than a separate seal being provided.

The second interface plate 298 has a central aperture 298a for providing communication between the outlet port 301 of the pressure relief valve 293 and the inlet 302 of the flow control valve 294, and two flanking apertures 298b for receiving the tie bars 295, 296. The plate 298 provides no communication between these three apertures 298a, 298b but one of the apertures 298b does provide sufficient clearance around the second tie bar 296 to allow the pilot feed signal to flow. Similarly the third interface plate 299 has three apertures of the same configuration as the second. In this instance the plate 299 is integrally formed with a mounting bracket 299a that extends laterally of the components. Again seals are provided to prevent undesirable leakage of the fluid between the housings.

The ends of the tie bars 295, 296 are threaded as before and threaded socket fixings F are screwed on to the ends in each case to retain the housings together on the bars.

The pilot feed signal is directed as before to the logic control valve 222 and returns through a pilot return passage defined in the housing of that valve to a pilot inlet 251 of the main stage control valve 220 as represented in FIG. 22. The embodiment of FIGS. 21 and 22 removes the need to configure the interior of the main stage control valve so as to establish a separate pilot feed signal.

It will be appreciated by one of ordinary skill in the art that the invention has been described by way of example only, and that the invention itself is defined by the claims. Numerous modifications and variations evident to the skilled reader may be made to the exemplary designs described above without departing from the scope of the invention as defined in the claims. For example, the stack of logic control valves and intermediate plates could extend from a lower surface of the main stage control valve and, moreover, the logic control valves and plates need not necessary be arranged in a vertical configuration but may alternatively extend horizontally from a side face of the main stage control valve. Furthermore, it is to be understood that the plates may be of any convenient thickness. Finally, it is to be appreciated that the stack may be supplemented with adaptor blocks with external media feeds. Such adaptor blocks may fitted in between the logic control valves in the stack and allow for the connection of other elements such as sintered breathers, exhaust pipe work, pressure relief valves, visual indicators or pressure feeds to ancillary valves. Each of the blocks would have the usual four bores for receipt of the tie bars and for permitting continuation of the pilot feed and exhaust passages. It is also to be understood that the provision of an exhaust manifold body is optional.

The invention claimed is:

1. Fluid flow control apparatus comprising a plurality of stacked valves with one or more intermediate flow-directing plates, the valves comprising a main valve having a housing defining an inlet and an outlet for connection into a fluid flowline and a pilot inlet for receipt of a pilot control fluid from a pilot control fluid flowline, the main valve being operable to open or close the fluid flowline in response to the pilot control fluid pressure, and at least one pilot-operated logic control valve having a housing for connection into the pilot control fluid flowline, the stack of valves defining a pilot feed passage of the pilot control fluid flowline for receipt of incoming pilot control fluid, and a pilot return passage of the pilot control fluid flowline that is selectively closable by operation of the logic control valve, the logic control valve being connected to the housing of the main control valve via a first intermediate flow-directing plate, the plate being perforated by a first aperture that interconnects the pilot return passage of the logic control valve and the pilot inlet of the main valve.

2. Fluid flow control apparatus according to claim 1, wherein the first intermediate flow-directing plate is perforated by a second aperture that interconnects the pilot feed passage in the logic control valve and a pilot feed outlet in the main valve.

3. Fluid flow control apparatus according to claim 1, wherein there is provided a plurality of said logic control valves arranged in the stack with a second intermediate flow-directing plate between each logic control valve, the, or each, second intermediate flow-directing plate having a first aperture that interconnects the pilot return passage of one valve and a pilot inlet of the next valve.

4. Fluid flow control apparatus according to claim 3, wherein the, or each, second intermediate flow-directing plate has a second aperture that interconnects bores in the valves to form part of the feed passage, wherein the pilot feed and return passages extend through all the logic control valves in the stack.

5. Fluid flow control apparatus according to claim 4, wherein the bores in the adjacent valve housings that define the pilot feed passage are substantially in alignment throughout the stack.

6. Fluid flow control apparatus according to claim 4, wherein the bores that define the pilot return passage in at least one pair of adjacent valve housings are offset.

7. Fluid flow control apparatus according to claim 6, wherein the aperture in the intermediate flow-directing plate that interconnects the bores in said pair of housings extends transversely of pilot return passage.

8. Flow control apparatus according to claim 1, wherein there is provided a common exhaust passage defined in the stack by the housing of the at least one control valve and the, or each intermediate flow-directing plate, the plate(s) having a third aperture forming part of the exhaust passage.

9. Flow control apparatus according to claim 8, wherein there is provided an exhaust manifold in the stack which comprises a housing with an exhaust outlet in fluid communication with the common exhaust passage.

10. Fluid flow control apparatus according to claim 9, wherein there is provided an intermediate flow-directing plate between the exhaust manifold and the at least one control valve.

11. Fluid flow control apparatus according to claim 1, wherein the stack is supported by a plurality of elongate tie bars received in bores through the valve housings and plates in the stack, and the pilot feed passage is defined at least in part by an annular clearance between a wall of a first bore and a first tie bar.

12. Fluid flow control apparatus according to claim 11, where there is provided a common exhaust passage defined in the stack, and wherein the exhaust passage is defined at least in part by an annular clearance between a wall of a second bore and a second tie bar.

13. Fluid flow control apparatus according to claim 11, the valve housings being substantially parallelepiped with upper and lower surfaces, and the tie bars being received in bores that pass through the housings between the upper and lower surfaces.

14. Fluid flow control apparatus according to claim 13, wherein the, or each, flow-directing plate has apertures for receipt of the tie bars aligned with said bores, one of the apertures being said first aperture, each aperture providing an annular clearance between the plate and the respective tie bar.

15. Fluid flow control apparatus according to claim 1, wherein the, or each, intermediate flow-directing plate between adjacent logic control valves in the stack has at least one first aperture that interconnects the pilot return passage in one control valve to the pilot inlet of the adjacent logic control valve.

16. Fluid flow control apparatus according to claim 15, wherein the first aperture that interconnects the pilot return passage to the pilot inlet is elongate and extends substantially perpendicular to the pilot return passage and the pilot inlet.

17. Fluid flow control apparatus according to claim 15, wherein the or each flow-directing plate between adjacent logic control valves has a second aperture that interconnects the pilot feed passage in one control valve with the pilot feed passage in the other control valve.

18. Fluid flow control apparatus according to claim 1, further comprising an end flow-directing plate in the stack, distal from the main control valve, that has an end aperture that interconnects the pilot feed and pilot return passages.

19. Fluid flow control apparatus according to claim 18, wherein said end aperture interconnects the pilot feed and pilot return passages is elongate and extends in a direction substantially perpendicular to the pilot feed and return passages.

20. Fluid flow control apparatus according to claim 1, wherein the logic control valve housings in the stack are substantially identical.

21. Fluid flow control apparatus according to claim 1 wherein the first aperture in the intermediate flow-directing plate is provided with a sealing ring to seal against leakage of fluid from between adjacent housings in the stack.

22. Fluid flow control apparatus according to claim 1, wherein there is provided a mounting bracket at an end of the stack distal from the main control valve.

23. Fluid flow control apparatus according to claim 1, wherein the outlet of the main control valve is connected to a valve actuator.

24. A method for controlling flow of pilot control fluid for a main control valve, comprising arranging a plurality of valves into a stack, the valves comprising the main control valve and at least one logic control valve, with an intermediate flow-directing plate between the, or each, valve, passing a pilot feed signal through a feed passage in the stack, the feed passage being defined by bores in the valve housings and an aperture in the plate, redirecting the pilot signal down through a pilot return passage in the stack to a pilot inlet in the main control valve, operating the logic control valve(s) to selectively open or close the return passage in accordance with predetermined requirements.

25. A method according to claim 24, further comprising using a plurality of logic control valves in the stack and using intermediate flow-directing plates between each logic control valve to direct the pilot feed signal from one logic control valve to another and to direct the redirected pilot signal from the pilot return passage of one valve to a pilot inlet of the next valve in the stack.

26. A method according to claim 25, further comprising directing the pilot feed and return flow through passages that extend through all the logic control valves in the stack.

27. A method according to claim 25, further comprising directing exhaust fluid through a common exhaust passage defined in the stack.

28. A method according to claim 25, wherein there is provided at least one tie bar received in a bore that extends through housings of the valves in the stack, and the pilot feed signal is directed through a clearance between a tie bar the wall of the bore.

29. Fluid flow control apparatus comprising: a control valve that is actuated by a pilot fluid control signal, the control valve having a first housing with a fluid inlet, a fluid outlet, a valve member between the inlet and the outlet that is actuable by the pilot fluid control signal to so as to control a flow of a fluid between the fluid inlet and outlet along a main fluid path, the first housing having a pilot inlet for receipt of the pilot fluid control signal; and at least one fluid flow control device connected to the control valve and having a second housing, the first and second housings being connected together by at least one elongate support member that is received in aligned bores in the housings, each bore being defined a peripheral bore wall, there being a clearance between the peripheral walls of each aligned bore and the at least one elongate support member, the clearance defining a pilot feed path for transmitting the pilot fluid control signal upstream of the pilot inlet.

30. Fluid flow control apparatus according to claim 29, wherein there is provided at least two fluid control devices arranged in a stacked relationship with the control valve.

31. Fluid flow control apparatus according to claim 30, wherein the elongate support member is received in the bores of each of the fluid control device housings, the pilot feed path being defined by means of a clearance between peripheral walls of the bores and the elongate support member.

32. Fluid flow control apparatus according to claim 29, wherein the elongate support member is a bar.

33. Fluid flow control apparatus according to claim 32, wherein the bar is a tie bar that is secured at each end by a securing element so as to retain the housings on the bar.

34. Fluid flow control apparatus according to claim 29, wherein the at least one fluid flow control device is provided upstream of the control valve.

35. Fluid flow control apparatus according to claim 34, wherein the at least one fluid flow control device has a passage in fluid communication with main fluid path for directing fluid to the inlet of the control valve.

36. Fluid flow control apparatus according to claim 29, wherein there is provided a fluid flow-directing interface seal between at least two adjacent ones of the housings.

37. Fluid flow control apparatus according to claim 36, wherein at least one interface seal is configured to provide fluid communication between the main flow path and the pilot feed path upstream of the pilot inlet.

38. Fluid flow control apparatus according to claim 36, wherein the fluid flow-directing interface seal is in the form of a plate with a sealing element, the plate being perforated by at least one aperture configured to direct fluid flow between adjacent housings.

39. Fluid flow control according to claim 38, wherein the at least one aperture extends in a direction transverse of the main flow path and the pilot feed path and interconnects the two paths.

40. Fluid flow control apparatus according to claim 29, wherein the at least one fluid flow control device is a logic control valve, the bore or bores in the second housing of each device being arranged to receive a pilot signal from a pilot feed passage in the first housing of the main valve.

* * * * *